United States Patent [19]

Linglain et al.

[11] Patent Number: 5,240,458
[45] Date of Patent: Aug. 31, 1993

[54] TORSION DAMPER INCLUDING A PRE-DAMPER HAVING A HOUSING WITH HOOKED TONGUES, IN PARTICULAR FOR A MOTOR VEHICLE

[75] Inventors: Frédéric Linglain, Amiens; Philippe Lhermite, deceased, late of Plachy-Buyon; Didier Gamonal, legal representative, Paris, all of France

[73] Assignee: VALEO, Paris, France

[21] Appl. No.: 857,835

[22] Filed: Mar. 26, 1992

[30] Foreign Application Priority Data

Mar. 29, 1991 [FR] France .................. 91 03845

[51] Int. Cl.⁵ .................................. F16D 3/66
[52] U.S. Cl. ..................... 464/63; 192/106.2; 464/68
[58] Field of Search .................. 464/62–68; 192/106.2

[56] References Cited

U.S. PATENT DOCUMENTS

| | | | |
|---|---|---|---|
| 4,700,822 | 10/1987 | Maucher et al. | 464/68 X |
| 4,883,156 | 11/1989 | Rohrle et al. | |
| 4,899,862 | 2/1990 | Graton et al. | |
| 5,000,304 | 3/1991 | Köck et al. | 464/68 X |
| 5,117,959 | 6/1992 | Graton | 464/68 X |

FOREIGN PATENT DOCUMENTS 0382616 8/1990 European Pat. Off. .
2642804 10/1990 France .

Primary Examiner—Daniel P. Stodola
Assistant Examiner—William G. Battista, Jr.
Attorney, Agent, or Firm—Longacre & White

[57] ABSTRACT

A torsion damper comprises a main damper plate surrounding a hub, and a pre-damper mounted on one side of the main damper plate and having a housing which is coupled to the main damper plate for rotation with the latter, by coupling fingers each of which is engaged in a complementary aperture formed in the main damper plate. Guide rings of the pre-damper are retained axially between a first shoulder formed on a set of resiliently deformable hooked tongues, and a second shoulder, with both these shoulders being carried by the housing.

Each hooked tongue extends radially inside a corresponding coupling finger and is also arranged to penetrate into the aperture corresponding to the associated coupling finger.

9 Claims, 3 Drawing Sheets

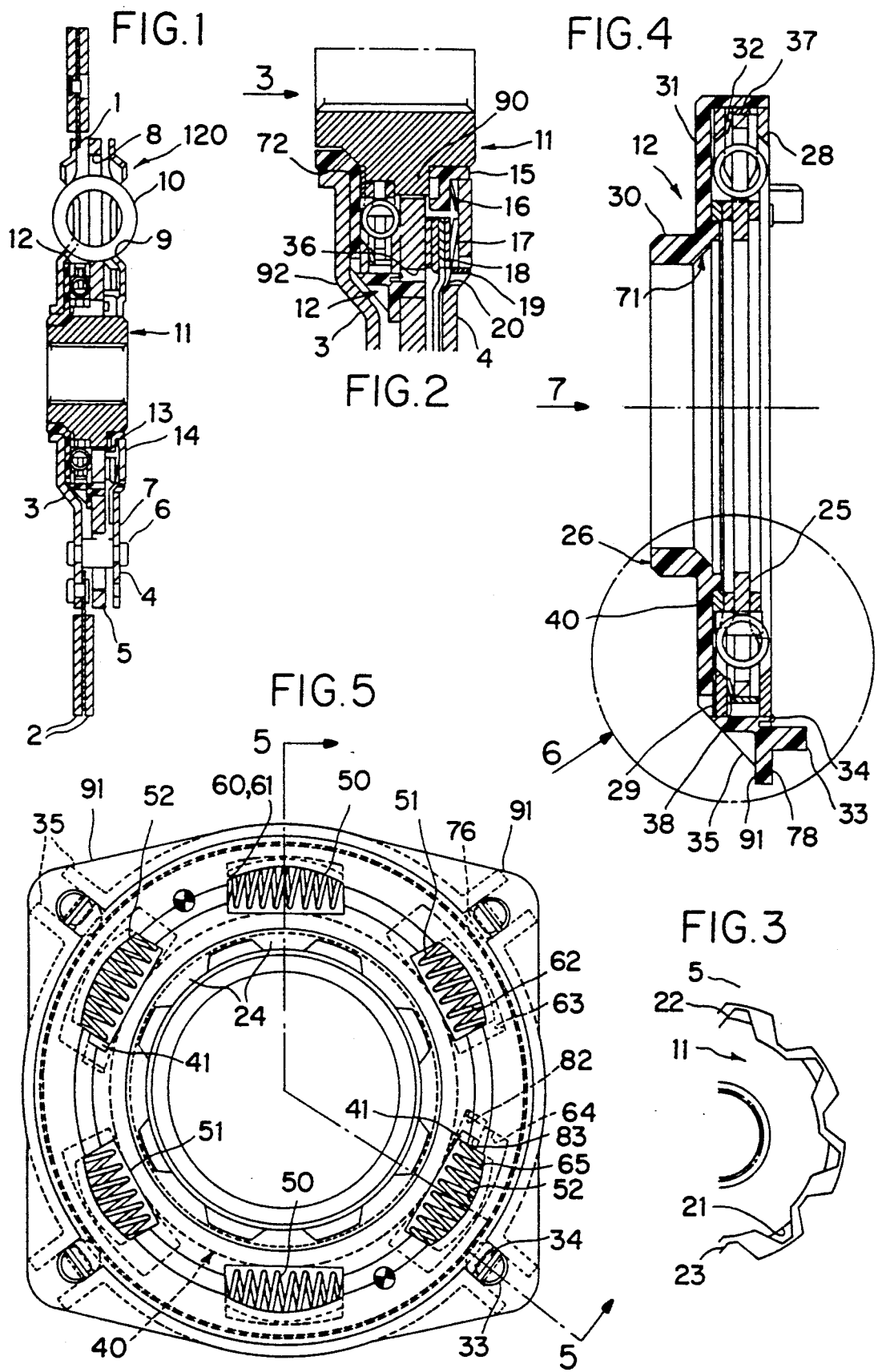

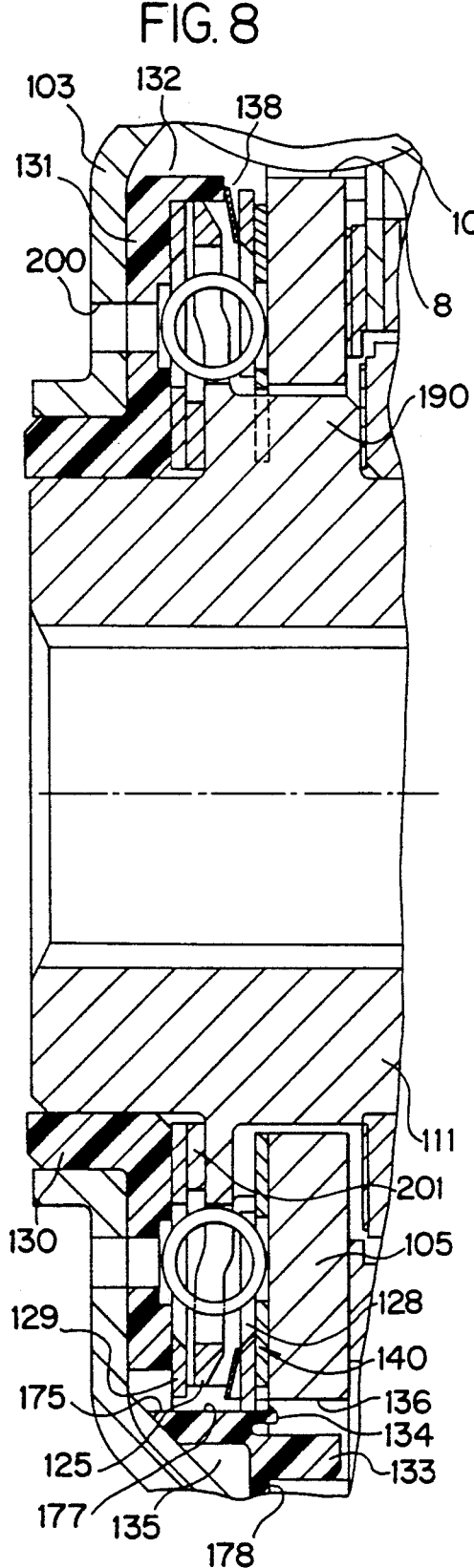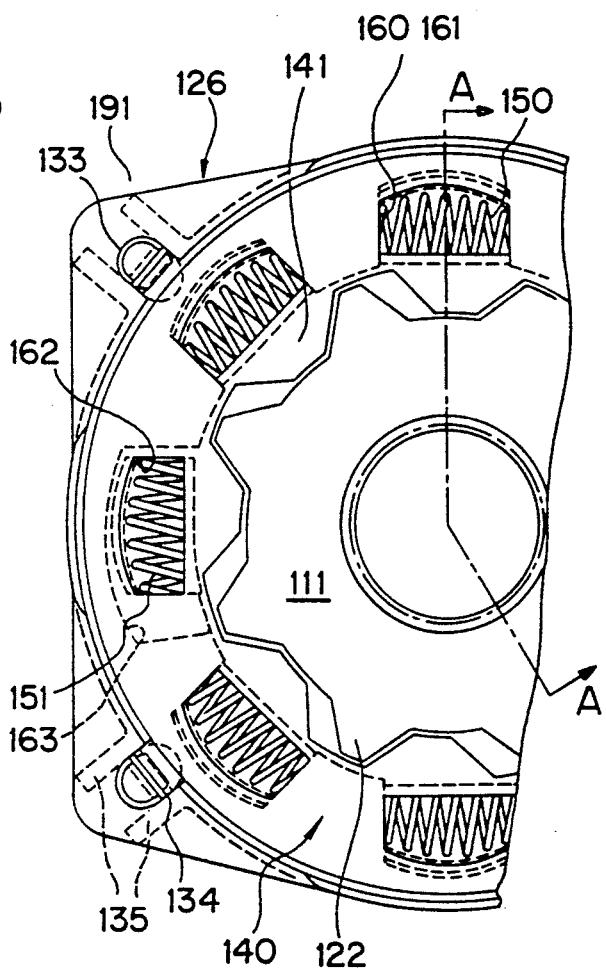

TORSION DAMPER INCLUDING A PRE-DAMPER HAVING A HOUSING WITH HOOKED TONGUES, IN PARTICULAR FOR A MOTOR VEHICLE

FIELD OF THE INVENTION

This invention relates to torsion dampers, in particular for friction clutches for motor vehicles, in which the torsion damper includes a hub, a main damper plate surrounding the hub with loose coupling means operatively interposed between them, and a pre-damper mounted on one side of the main damper plate and having a housing which is coupled in rotation to the main damper plate through coupling means.

BACKGROUND OF THE INVENTION

A torsion damper of the above kind is described in the specification of U.S. Pat. No. 4,883,156, in which the housing contains a secondary damper plate surrounding the hub and coupled in rotation to the latter, together with two secondary guide rings which are arranged on either side of the secondary damper plate. Between the secondary guide rings and the secondary damper plate, circumferentially acting resilient means are arranged to act, these resilient means being of lower stiffness than the circumferentially acting resilient means which couple the main damper plate to main guide rings which are themselves coupled together and arranged on either side of the main damper plate. The pre-damper is fitted between one of the main guide rings and the main damper plate.

In the above mentioned United States patent specification, the secondary guide rings are arranged for rotation with the housing of the pre-damper, but are movable axially with respect to the housing, while being retained axially between a first and a second shoulder carried by the housing. The above mentioned coupling means comprise a plurality of coupling fingers carried by the housing, with each coupling finger being arranged to cooperate with a complementary aperture of the main damper plate. The first shoulder carried by the housing (i.e. that one of the said shoulders that is the nearer to the main damper plate) is defined by a plurality of resiliently deformable, hooked tongues which are formed in an axially oriented flange of the housing, these tongues being overlaid by two of the said coupling fingers.

The above arrangement is in many respects satisfactory, since it enables the pre-damper to be fitted easily by simple axial threading of its components into the housing. Nevertheless it increases the axial size of the damper as a whole, since it is necessary that the tongues be positioned back from the free end of the axial flange of the housing so as to avoid any interference with the main damper plate.

DISCUSSION OF THE INVENTION

An object of the present invention is to overcome the above drawbacks, by providing a novel pre-damper which can be fitted by axial introduction of its components, but which is of shorter axial size.

According to the invention there is provided a torsion damper, in particular for a motor vehicle friction clutch plate, comprising a hub, a damper plate surrounding the hub with loose coupling means acting between them, a pre-damper mounted on one side of the damper plate and having a housing which is coupled in rotation to the damper plate through coupling means comprising coupling fingers each of which is engaged in a complementary aperture in the damper plate, with the said housing containing a secondary damper plate which surrounds the hub to which it is coupled in rotation, together with two guide rings arranged on either side of the secondary damper plate, with circumferentially acting resilient means arranged to act between the said guide rings and secondary damper plate, the said circumferentially acting resilient means being of low stiffness as compared with further circumferentially acting resilient means which couple the main damper plate to main guide rings that are coupled together and arranged on either side of the main damper plate, the said guide rings of the pre-damper being fixed in rotation to the housing but being arranged for axial movement with respect to the latter while being retained axially between a first shoulder and a second shoulder, the said first shoulder being closer to the main damper plate than the second shoulder and the latter being carried by the said housing, the first shoulder being defined by resiliently deformable hooked tongues formed in an axially oriented flange of the housing, is characterised in that each said hooked tongue extends radially inwardly of a respective coupling finger, and in that the said tongue is also arranged to penetrate into the said aperture of the main damper plate associated with the said respective coupling finger.

With this arrangement, the axial length of the pre-damper can be reduced, and a very small clearance may exist between the damper plate and the relevant guide ring of the pre-damper.

According to a preferred feature of the invention, the said aperture has a circumferential shape complementary to that of the associated coupling finger, and a greater radial depth.

It will be noted that the mechanical strength of the main damper plate is improved since it is possible to reduce the number of coupling fingers in the arrangement of the present invention.

According to a further preferred feature of the invention, each coupling finger and each hooked tongue is formed in a common one of a plurality of radial projections carried by the housing at its outer periphery. Each of these projections has a radial engagement surface. This arrangement gives good engagement of the pre-damper with the main damper plate.

For good torque transmission and good mechanical strength, each of these projections preferably has two stiffening ribs arranged on either side of a coupling finger and hooked tongue.

Preferred embodiments of the invention will be described below, by way of example only and with reference to the accompanying drawings.

BRIEF DESCRIPTION OF THE DRAWINGS

FIG. 1 is a view in axial cross section of a friction clutch wheel in accordance with the invention.

FIG. 2 is a view on a larger scale showing the central part of FIG. 1.

FIG. 3 is a view as seen in the direction of the arrow 3 in FIG. 2, showing one half of the loose coupling means interposed between the main damper plate ad the hub.

FIG. 4 is a cross sectional elevation taken on the line 5—5 in FIG. 5, and showing the pre-damper in accordance with the invention.

FIG. 5 is a front view showing the pre-damper itself.

FIG. 8 corresponds to part of FIG. 1, but shows, on a much larger scale, a second embodiment of the invention.

FIG. 9 is a view corresponding to part of FIG. 5, but relates to the same second embodiment as FIG. 8.

DESCRIPTION OF PREFERRED EMBODIMENTS OF THE INVENTION

Figure 6:
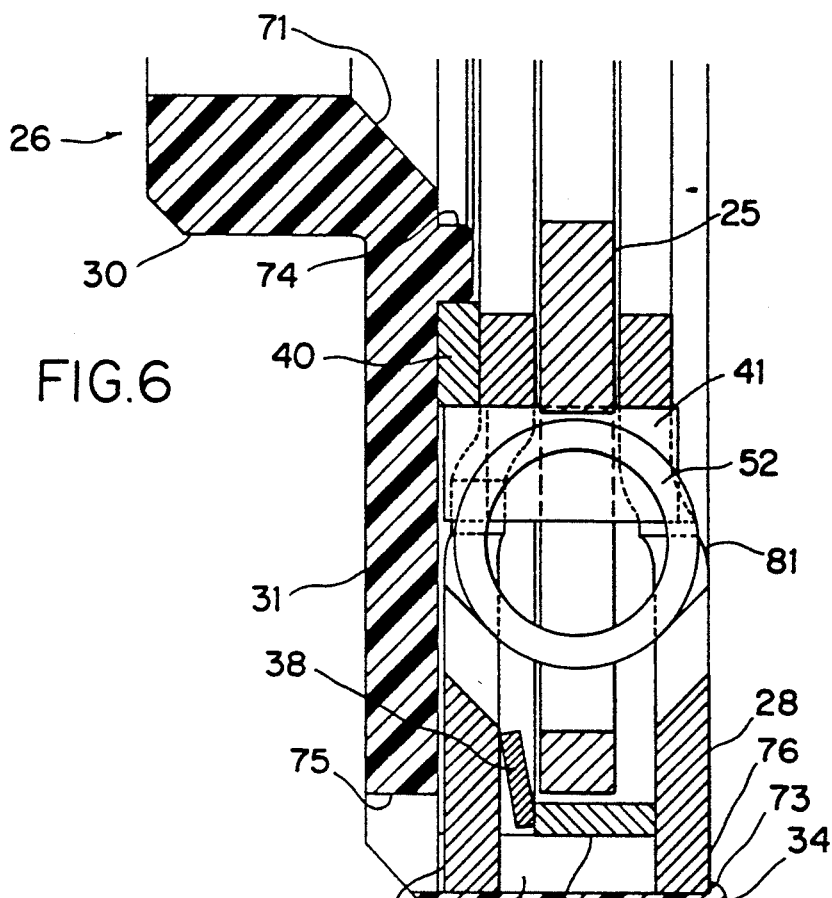
FIG. 6 is a view on a larger scale corresponding to the part of FIG. 4 indicated with a circle at 6.

The torsion damper shown in the drawings is incorporated in a clutch wheel of a motor vehicle friction clutch. The clutch wheel comprises a support member 1 and a hub 11 coaxial with the support member 1. These two components are movable in rotation with respect to each other within the limits of a predetermined angular displacement. The support member 1 and the hub 11 are coupled together through two torsion damping devices acting in a stepped manner. The first of these is a pre-damper 12, the other being a main damper 120. The pre-damper 12 is less powerful than the main damper 120. In this example, a plurality of friction liners 2 are secured on either side of the support member 1. The friction liners 2 may be discontinuous, and are adapted to be gripped between the pressure plate and the reaction plate (neither of which is shown) of the clutch, which are carried by the crankshaft of the engine for rotation with the latter. The hub 11 is adapted to be coupled in rotation to the input shaft of the gearbox (again not shown), for which purpose the hub 11 has an internally splined bore.

The main damper 120 comprises a damper plate 5, referred to as the main damper plate, together with two main guide rings 3 and 4 arranged on either side of the damper plate 5. The guide rings 3 and 4 surround the hub 11, and are secured to each other by any suitable means. In this example the guide rings are secured together by means of spacers 6, each of which passes through a hole 7 formed in the damper plate 5. The damper 120 also includes resilient means 10 arranged for angular displacement and interposed circumferentially between the damper plate 5 and the guide rings 3 and 4; together with associated friction means 14. The resilient means comprise a plurality of coil springs 10, which are spaced apart at regular intervals about a common pitch circle, each spring 10 being mounted in a window 8 formed in the main damper plate 5 and in a further window 9 formed in each of the guide rings 3 and 4. The windows 9 and 8 are arranged in register with each other.

The action of the springs 10 is, in this example, stepped or staged. Four of these springs 10 are provided, two of them being mounted without a clearance in the windows 8 and 9, while the other two are mounted without a clearance in the windows 9 but with a clearance in the windows 8. It is of course possible to provide six springs as disclosed in the specification of U.S. Pat. No. 4,883,156, and the resilient means 10 may consist of blocks of a suitable resilient material instead of being coil springs.

The friction means 14 comprise, as shown in FIG. 2, an axially acting resilient ring 17 which in the present example is a Belleville ring. This bears on the guide ring 4 and on a friction ring 18 so as to bias the latter towards the main damper plate 5, with a second friction ring 20 and a third friction ring 19 being interposed between the friction ring 18 and the main damper plate 5. The friction ring 19 is provided with lugs or toes for coupling it in rotation with the guide ring 4 by engagement of the toes with holes which are provided for this purpose in the guide ring 4, as can be seen in FIG. 2. It should be noted that the guide ring 20 is in this example similar to that disclosed in the specification of U.S. Pat. No. 4,883,156.

The pre-damper 12 is disposed between the main damper plate 5 and the guide ring 3, radially inside the pitch circle on which the springs 10 are mounted. The pre-damper 12 comprises a unitary assembly surrounding the hub 11 and adapted to be gripped between the main damper plate 5 and the guide ring 3, under the action of the Belleville ring 17. The pre-damper 12 has two secondary guide rings, indicated at 28 and 29 and arranged on either side of a secondary damper plate 25. This arrangement is most clearly seen in FIG. 6.

The pre-damper 12 has further friction means 13, comprising an axially acting resilient ring 16 (again a Belleville ring in this example), which is mounted in opposition to the Belleville ring 17 but which is of lower stiffness than the latter. The friction means 13 also include an annular bearing 15, of L-shaped cross section having an axially oriented portion, interposed radially between the outer periphery of the hub 11 and the inner periphery of the guide ring 4, and also having a radially oriented portion which is biassed by the Belleville ring 16 into contact with a flange 90 formed on the outer periphery of the hub 11 (see FIG. 2).

The bearing 15 is coupled in rotation to the guide ring 4 in mating relationship, with the bearing including bosses engaging for this purpose in complementary recesses formed in the guide ring 4 at its inner periphery.

The Belleville ring 16 causes the pre-damper 12 to be gripped axially between the hub 11 and the guide ring 3. It will be noted that the guide ring 3 has at its inner periphery a portion which is offset outwardly in the axial direction by virtue of a fold 92, so as to accommodate the pre-damper 12.

The flange 90 is formed with trapezoidal teeth 22 which mesh, with a clearance, with further teeth 23 formed at the inner periphery of the main damper plate 5 (FIG. 3). The main damper plate 5 thus surrounds the hub 11, with loose coupling means 22, 23 arranged between the plate 5 and hub 11. The pre-damper 12 is mounted on one side of the main damper plate 5, and has a housing 26 which is coupled in rotation to the main damper plate 5 by means of coupling means 33, 36 acting between the damper plate 5 and the housing 26. In this example, these coupling means comprise four coupling fingers 33 engaging in complementary apertures or slots 36 (FIG. 2) which are formed in the main damper plate 5.

The housing 26 accommodates the guide rings 28 and 29 together with the secondary damper plate 25, and is also open in the middle. The housing 26 is annular in shape and includes within it an axially oriented portion 30 which acts as a bearing interposed radially between the guide ring 3 and the hub 11. For this purpose (see FIG. 2) the guide ring 3 has a flange oriented axially at its inner periphery.

The axially oriented portion 30 has an internal frusto-conical surface 71 for cooperation with a further frusto-conical surface 72 which is formed on the outer periphery of the hub 11. The portion 30 is joined to a transverse wall 31 forming the base of the housing, adjacent to the guide ring 29. The wall 31 carries, at its outer periphery, an axially oriented annular flange 32 acting as a spacer and fixed with respect to the coupling fingers 33 in a manner to be described below.

Circumferentially acting resilient means 50, 51, 52 are arranged to act between the guide rings 28, 29 and the secondary damper plate 25. The stiffness of these resilient means is lower than that of the springs 10 of the main damper 120, and they are arranged on a pitch circle of smaller diameter than that of the springs 10. In this example the resilient means 50, 51 and 52 consist of coil springs which are arranged in pairs of diametrically opposed springs, at regular intervals on a common pitch circle, being mounted in windows formed facing each other in the secondary damper plate 25 and in the guide rings 28 and 29. More precisely, two springs 50 are mounted without clearance in the windows 60 and 61 in register with each other in the guide rings 28, 29 and the damper plate 25. Two springs 52 are mounted without clearance in the windows 65 in the guide rings 28 and 29, but with a clearance in windows 64 of the damper plate 25.

The remaining pair of springs, 51, are mounted without clearance in the windows 62 of the guide rings 28 and 29, but with a clearance in the windows 63 of the damper plate 25. In this example the windows 63 extend in the circumferential direction by a greater amount than the windows 64. The springs 51 and 52 act after the springs 50, and are referred to as differential action springs.

The secondary damper plate 25 is fixed to the hub 11 for rotation with the latter, and projects radially inwardly with respect to the guide rings 28 and 29. It has internal teeth 24, which are arranged to cooperate without clearance with a set of teeth 21 formed on the hub 11. In practice, the hub teeth 21 are aligned with the other hub teeth 22 which form part of the loose coupling with the main damper plate 5, but the teeth 21 are shorter radially than the teeth 22, from which they are also offset axially.

The guide rings 28 and 29 of the secondary damper (i.e. the pre-damper) are fixed with respect to the housing 26 for rotation with the latter, while being movable axially with respect to it. To this end the guide rings 28 and 29 have at their outer periphery radial tenons 76 projecting at intervals and arranged to cooperate with grooves 77 formed at the level of the flange 32. It will of course be understood that the reverse arrangement is possible. The guide rings 28 and 29 are retained axially by the housing 26, by virtue of two shoulders 31 and 73 carried by the latter. In this example the second shoulder (which is referred to as such for convenience) is the one that is further away than the other from the main damper plate 5, and consists of the wall 31 itself. The first shoulder, i.e. that which is the nearer to the main damper plate 5, consists of hooks 73 carried by tongues 34 to be described below.

The pre-damper 12 thus forms a unit which is easily able to be handled and transported by virtue of its housing 26, this unit being mounted on the hub 11 by fitting the teeth 24 of the secondary damper plate 25 axially into the teeth 21 of the hub 11.

It will be recalled that, at the beginning of the angular displacement movement between the hub 11 and main damper plate 5, this movement being permitted and limited by the loose coupling means 22, 23, the damper plate 5 is displaced angularly with respect to the hub 11 against the action of the pre-damper 12, with the pairs of springs 50, and then the pairs of springs 52 and 51, being compressed in succession until the clearance is taken up in the coupling means 22 and 23. In this first phase, since the springs have a greater stiffness than the springs 50, 51 and 52, the effect is as though the main damper plate 5 were fixed with respect to the guide rings 3 and 4. During this phase, frictional effects appear between the bearing 15 and the hub 11, and also between the axially oriented portion 30 of the housing 26 and the hub 11, and more particularly between the frusto-conical surfaces 71 and 72. For this purpose the housing 26 is preferably made of a plastics material having a low coefficient of friction. During a second phase, once the clearance in the loose coupling means 22, 23 has been taken up, the springs 10 become compressed and a frictional effect appears, especially, between the second friction ring 19 and the main damper plate 5, and between the guide ring 3 of the main damper and the wall 31 of the pre-damper housing 26, these friction effects being produced under the loading imposed by the Belleville ring 17.

The limitation of the angular displacement between the guide rings 3 and 4 on the one hand and the main damper plate 5 on the other is determined by interlocking of adjacent turns of the springs 10, or alternatively by cooperation between the spacing bars 6 and the appropriate circumferential edge of the associated holes 7.

It will be noted that friction means are mounted within the pre-damper 12, and that they comprise axially acting resilient means 38 which are disposed axially between the guide rings 28 and 29. A friction ring 40 is mounted within the housing 26, axially between one of the shoulders 31 or 73 of the housing and the guide ring 28 or 29 which is closest to the shoulder 31. The above mentioned resilient means 38 bear on the guide ring 29, so as to bias the guide rings 28 and 29, spaced axially from each other, towards the two shoulders 73 and 31, and so as to grip the friction ring 40 axially.

The friction ring 40 is provided with projections 41 which pass with a first circumferential clearance through an opening 65, 80 (see FIG. 7), which is formed in the guide ring 29 closest to the friction ring 40, for coupling in rotation (with a second circumferential clearance) with the secondary damper plate 25. In this example, there are two projections 41 in the form of fingers extending axially from the guide ring 29 to the guide ring 28 and passing through the windows 64. These fingers 41 are diametrically opposed to each other, and are associated with the springs 52. Each of the guide rings 28 and 29 has at its inner periphery a fold 81 which is extended by an axial portion delimiting the inner periphery of the guide ring 28 or 29. The guide rings are brought closer to each other at their inner periphery by virtue of the folds 81, and there is a clearance between the guide ring 29 and the base 31 which enables space to be made available for mounting the friction ring 40. The axial size is thus reduced to enable the friction ring 40 to be fitted without unduly increasing the axial size of the pre-damper 12.

The fingers 41 pass, with a clearance, through the opening 80, which is a passage formed in a radial edge of the window 65 of the guide ring 29. This passage 80, in the form of a finger, is a circumferential extension of the inner circumferential edge of the window 65, and extends radially partly into the fold 81. The window 65 is of greater radial extent than the passage 80, so that the spring 52 engages sufficiently on the relevant radial edge of the window 65. That one of the windows 65 that is formed in the guide ring 28 is of the same circumferential length as the one in the guide ring 29, but has a passage forming a circumferential extension 83, of reduced length as compared with the passage 80. This passage 83 has a shape complementary, subject to fitting clearances, to that of the free end of the finger 41, so that the spring 52 is able to engage firstly on the corresponding radial edge of the window 65 and secondly on the finger 41 itself.

The free end of the finger 41 is thus fitted generally without any circumferential clearance between the spring 52 and the base of the passage 83. The finger 41 acts as the radial flange of the window 65 adjacent to the passage 83. Thus, the finger 41 acts as the appropriate radial edge of the window 65 in the guide ring 29, in place of that which is absent by virtue of the passage 80, since the finger is trapped between the spring 52 and the base of the passage 83 in the guide ring 28.

The window 64 in the secondary damper plate 25 has at its inner periphery an extension 82 defining a passage and acting as the radial edge of the window 64 in the same way as the extension 83 acts as a passage extending the window 65. The friction ring 40 then meshes, with a clearance, with either the secondary damper plate 25 or the hub 11, this being the former in the example shown in the drawings.

Figure 7:
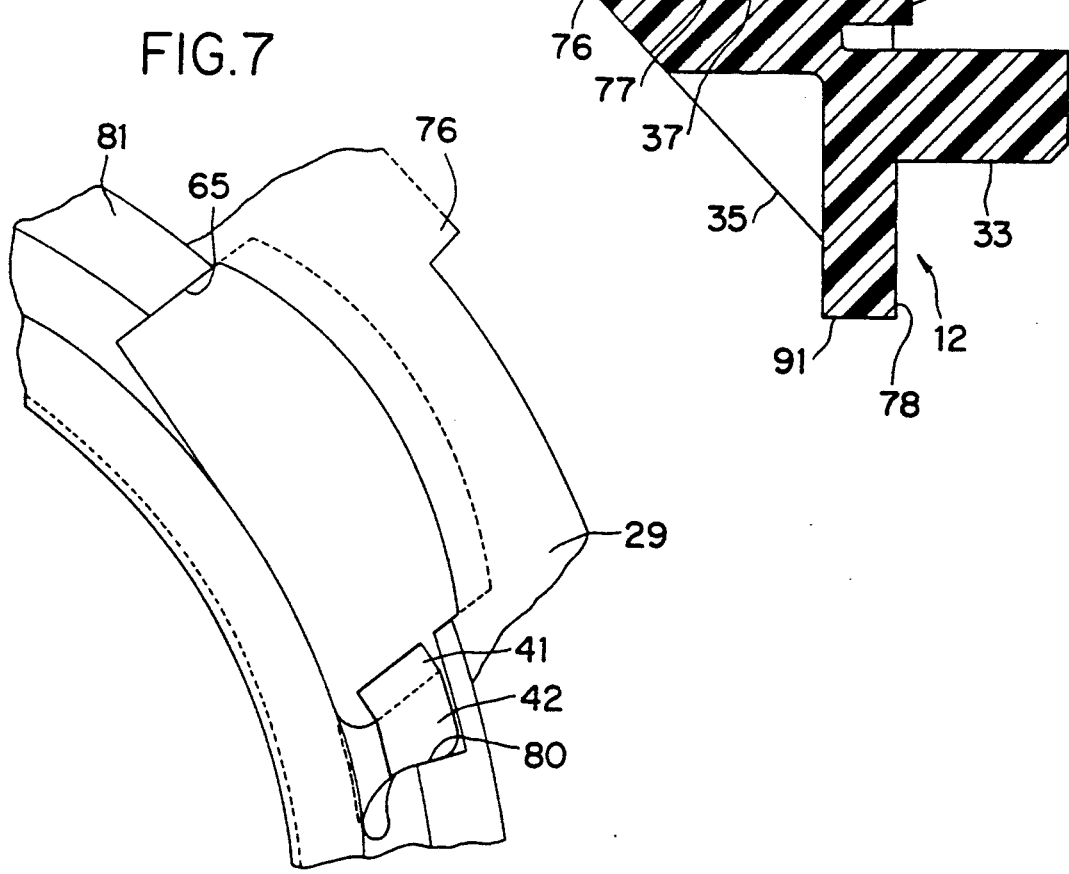
FIG. 7 is a scrap view as seen in the direction of the arrow 7 in FIG. 4 showing the passage of one of the toes of the friction ring into the appropriate guide ring.

As is best seen in FIG. 7, each finger 41 extends from a radial ear 42 which penetrates into the passage 80, with the main portion of the friction ring 40 extending below the springs 50, 51 and 52 disposed on a common circumference with respect to the axis of the assembly as can be seen in FIG. 5. The finger 41 has the shape of a curtain as seen in FIG. 6, giving a good abutment surface for the spring 52. The depth of the finger 41 is slightly smaller than the radius of the spring 52.

The resilient means 38 mentioned above consist, in this example, of a further Belleville ring which bears on the guide ring 29 and on a free end of a spacing ring 37, so as to bias the latter towards the other guide ring 28 (see FIG. 6). The spacing ring 37 surrounds the secondary damper plate 25, its axial length depending on the particular application and being chosen in such a way that the spacing ring extends axially beyond the damper plate 25, so that the Belleville ring 38 then lies in the axial space delimited by the guide ring 29 and the damper plate 25, without the Belleville ring 38 interfering with the damper plate 25.

In a modification, the spacing ring 37 may be formed integrally with the Belleville ring 38, which then comprises, for example, a plurality of lugs extending from the free end of the spacing ring 37, the component being preferably made of a plastics material. It is of course possible reverse the positions of the rings 37 and 38, with the resilient ring 38 then bearing on the guide ring 28.

In all cases, the friction ring 40 is gripped axially between the wall or transverse base 31 of the housing 26 and the guide ring 29, while the guide ring 28 is held flat against the hooks 73, with a clearance appearing between the guide rings 28, 29 and the secondary damper plate 25.

In this example, the spacing ring 37 is centred by the inner periphery of the flange 32, while the friction ring 40 is centered by means of a centring ring portion 74 of the wall 31. This ring portion 74 projects axially from the wall 31 into the interior of the housing 26 over a length which is shorter than the thickness of the friction ring 40. The ring 74 can of course be of interrupted shape, and may even consist merely of three centring pads spaced apart at 120° intervals from each other. The housing 26 thus carries centring means for the friction ring 40, these centring means being disposed on the inner periphery of the housing wall 31 close to the inner frusto-conical surface 71.

The first shoulder 73 is defined on a hook formed on the free end of the tongue 34 previously mentioned. This tongue is resiliently deformable and extends axially parallel to the finger 33 (see FIG. 6). Each tongue 34, with its hook 73, extends radially inwardly of a coupling finger 33, in this example over a smaller axial length than the latter. The tongue 34 is also arranged to penetrate into the aperture 36 (FIG. 2) of the main damper plate 5 associated with the same coupling finger 33. In the circumferential direction this aperture 36 has a shape complementary to that of the coupling finger 33, but has a greater radial dimension. Preferably the aperture 3, and the associated coupling finger 33, is wider in the circumferential direction than the tongue 34, so as not to interfere with the latter and thereby to protect it. The tongues 34 are thus aligned with the coupling fingers 33. It will be noted that the latter are formed internally with a flat. In this example, four coupling fingers 33, and therefore four tongues 34, are provided as shown in FIG. 5, by contrast with the arrangement disclosed in the specification of U.S. Pat. No. 4,883,156. This enables good mechanical resistance to be offered to the main damper plate 5.

The coupling fingers 33 and tongues 34 are each formed in a radial projection 91 carried at the outer periphery of the housing 26. As shown in this example, one of these projections 91 is associated with each set of components comprising one coupling finger 33 and the associated tongue 34 with its hook 73. The projections 91 extend radially into the circumferential space which is delimited by two consecutive springs 10, and do not interfere with the latter. In this way the best possible use is made of the available space.

Each projection 91 has in this example a pointed shape with a rounded apex, and also has a radial engagement surface 78 extending radially outwardly of the coupling fingers 33. Thus the housing 26 is preferentially caused by its radial engagement surfaces 78 to bear on the main damper plate 5, with a slight clearance existing between the guide ring 28 and the damper plate 5 as can be seen in FIG. 2. For good torque transmission and good mechanical resistance, each projection 91 is formed with two stiffening ribs 35.

These ribs are arranged on either side of the associated coupling finger 33 and its corresponding tongue 34 (see FIG. 5). The stiffening ribs 35 join the engagement surface 75 to the flange 32, with each projection 91 having an internal axial groove 77. Since the housing 26 is preferably of a plastics material, four passages 75 are formed in the housing wall 31 for purposes of stripping it from the mould. These passages are formed in the outer periphery of the wall 31 so as to form the grooves 77 and hooks 73 by axial removal from the mould.

It will be appreciated that the tenons 76 of the guide ring 28 have a double function, namely that of transmitting torque and acting as abutments for cooperation with the hook 73. As will have been understood from the foregoing, fitting of the pre-damper is achieved by simply offering its various components up axially into the housing 26, with the tongues 34 being caused to deform during assembly. It will be noted that the grooves 77, the tongues 34 and the coupling fingers 33 extend radially beyond the flange 32, and that the housing 26 has a generally rectangular contour as shown in FIG. 6, with a projecting nose being defined by its axial portion 30.

The pre-damper operates in the following way. In a first stage in the angular displacement between the hub 11 and the main damper plate 5, the secondary damper plate 25 being fixed in rotation with respect to the hub 11 through its teeth 24, the springs 50 are compressed alone, with no friction appearing between firstly the friction ring 40, housing wall 31 and guide ring 29, and secondly between the damper plate 25 and the guide rings 28 and 29, due to the presence of a clearance between the secondary damper plate 25 and the guide rings 28, 29 (FIG. 6). This first stage continues until the fingers 41 come into engagement against the base of the passage 82, and thus against the secondary damper plate 25, so as to become coupled in rotation with the latter.

In a second stage, the springs 52 become compressed, and the friction ring 40 is then operative since, as it is then coupled in rotation to the secondary damper plate 25, friction appears between the friction ring 40 and the pair of components comprising the housing wall 31 and guide ring 29. Finally, in a third stage, the springs 51 come into action.

When motion in the opposite direction is caused to take place between the guide rings 28, 29 and the secondary damper plate 25, the latter returns the friction ring to its previous state. The friction ring 40 comes into action later.

As will have been understood from the foregoing, the components 25, 28 and 29 may be of metal or of a plastics material, since at the beginning of the angular displacement motion, the friction effects between the guide rings 28 and 29 and the secondary damper plate 25 are very small or even nil. The first clearance is, in this example, determined by the window 65, while the second clearance is a function of the window 64 and of the passage 82 formed in the secondary damper plate 25.

As will also have been understood from the foregoing, second loose coupling means defined by the fingers 41 and the passage 82 act between the friction ring 40 and the secondary damper plate 25. It will also be noted that the stiffening ribs 35 are arranged at the level of the fold 92 in the guide ring 3 of the main damper (FIG. 2), and that the whole arrangement is very compact in the axial direction, the axial length of the flange 32 and the position of the surface 78 being such that there is a minimal clearance between the pre-damper guide ring 28 and the main damper plate 5 (see FIG. 2 again).

The present invention is of course not limited to the embodiments described here, and in particular the housing 26 may consist of several components, the second shoulder being formed on an L-shaped member including the portions 30 and 31 and fixed to the flange 32. In a modification, this L-shaped member, and more particularly the portion 31, may be mounted axially in both directions on the flange 32 by means of a shoulder in one direction and by means of hooks carried by lugs in the other direction, with the main damper guide ring 3 being arranged to have apertures through which these hooks can pass. In that event, the component 30, 31 can be made freely rotatable with respect to the flange 32; in another modification, it may alternatively be connected to the flange 32 through a joint of the tenon and mortice type, using the grooves 77.

The friction ring 40 and the spacing ring 37 may of course be omitted, with the Belleville ring 38 then bearing on the secondary damper plate 25 so as to bias the latter towards the guide ring 28. The Belleville ring 38 then has tenons engaged in the grooves 77 for coupling it in rotation with the housing. Similarly, the surfaces 78 may in certain cases be omitted, with the pre-damper bearing on the damper plate through the free end of the spacing flange 32. Also, the number of coupling fingers and tongues 34 need not be identical.

The coupling of the guide rings 28 and 29 of the pre-damper in rotation with the housing 26 may be made by means of ribs projecting from the inner periphery of the flange 32, with the guide rings then 28 and 29 having slots in their outer periphery. In that case, the tongues are extensions of these ribs, with each tongue having a free end in the form of a widened hook so as to be able to cooperate directly with the appropriate guide ring. There may be only one stiffening rib on each projection 91, according to the application.

Two fingers 41 may be provided for each spring 52, with each finger being arranged at the circumferential end of the spring 52 so as to define a fork. In a modification, a flat, axial finger may be provided passing through an aperture in the guide ring 29, for cooperation (with a clearance) with the secondary damper plate 25, together with two radial fingers engaging with the circumferential ends of the spring 52.

The friction ring 40 may act like a drawer, and pass with a first clearance through the guide ring 29 for cooperation, with a second clearance, with the damper plate 25 without interference with the springs 51, 52 and 50.

The fingers 41 may be carried on the friction ring 40, while the projections of the friction ring 40 may consist of pins fitted as separate components on the friction ring.

The friction ring may of course be gripped between the relevant guide ring and the main damper plate. Thus, and referring now to FIGS. 8 and 9, in which the elements common to FIGS. 1 to 7 are given the same reference numerals but increased by 100, the friction ring 140 is interposed axially between the main damper plate 105 and the guide ring 128 that is closest to the damper plate 105, which acts as a pressure plate for the friction ring 140.

This friction ring 140 has projections 141 in the form of teeth on its inner periphery, with these teeth meshing with a clearance with teeth 122 of the hub 111. These two sets of teeth define a loose coupling means between the hub 111 and the main damper plate 105.

The secondary damper plate 125 is integral with the hub 111, being formed on the flange 190 of the latter. It delimits one of the ends of this flange, and extends radially into the space lying between the main guide ring 103 and the main damper plate 105. The guide ring 129 adjacent to the base 131 is thus longer in the radial direction than the guide ring 128 which freely surrounds the flange 190, and a spacing ring 201 is interposed axially between the guide ring 129 and the damper plate 125.

The base 131 of the housing 126 is formed with an inspection aperture for the springs 150 and 151, while the bearing 130, like the hub 111, has no conical portion.

The resilient means 138 bear on the free end of the axially oriented, annular peripheral flange 132 of the housing 126. The flange 132 surrounds the secondary damper plate 125 and constitutes the spacer means which are provided in accordance with the invention. The Belleville ring 138 is mounted axially between the guide ring 128 and the damper plate 125, the latter having an external chamfer to avoid any interference between the damper plate and the ring 138, which acts on the ring 128 and not on both the guide rings as in the previous examples.

The flange 132 is shorter than in the embodiments described above, except at the level of the coupling fingers 133, and it extends beyond the edge of the secondary damper plate 125. To this extent the structure of the housing 126 is similar to that of the housing 26 described in relation to the previous examples. Thus the housing 126 has projections 191, of generally triangular shape with a rounded apex, while four tongues 134 are also provided. These tongues, or fingers, 134 are hooked and extend below the coupling fingers 133 over a length shorter than the latter, and are arranged to penetrate into the interior of the aperture 136 associated with the fingers 133.

Stiffening ribs 135 are arranged on either side of a coupling finger 133 and finger 134. These ribs ensure coupling with the flange 132. The guide rings 128 and 129 are formed with tenons cooperating with grooves 177 provided internally on the projections having mould stripping passages 175.

It will be noted that the number of springs 150, 151 is greater than that in the previous embodiment. In the latter, the friction ring 140 is formed with windows for mounting without clearance on the springs 150, 151. The springs 150 are mounted without clearance in the windows 160 of the guide rings 128, 129 and with clearance in the windows 161 of the secondary damper plate 125. The springs 151 are mounted without clearance in the windows 162 of the guide rings 128 and 129, but with a clearance in the windows 163 of the secondary damper plate 125. Thus at the beginning of an operation, the friction ring 140 is fixed with respect to the guide ring 128; but then, after the clearance has been taken up between the sets of teeth 122 and 141, it becomes fixed with respect to the hub 111 for rotation with the latter. Friction effects therefore appear between the friction ring 140 and the guide ring 128, and also between the friction ring 140 and the main damper plate 105. The springs of the pre-damper restore the friction ring 140 to its rest position.

In the assembly operation, a sub-assembly is easily formed consisting of the housing, the guide rings 128 and 129, and the hub 111, by virtue of the hooks on the fingers 134 which enable the hub 111 to be assembled to the pre-damper. Once this sub-assembly has been made, the main damper plate and the main guide rings, together with the friction ring 140, are fitted. The hooks on the fingers 134 are then spaced from the guide ring 128, so that the surface 178 comes into contact with the main damper plate 105.

What is claimed is:
1. A torsion damper comprising:
a hub;
a main damper plate surrounding the hub, the hub and main damper plate defining loose coupling means coupling the main damper plate and the hub together for limited relative rotation;
a plurality of main guide rings disposed on either side of the main damper plate;
means coupling the main guide rings together for simultaneous rotation;
first circumferentially acting resilient means coupling the main damper plate and the main guide rings together;
a pre-damper;
and means mounting the pre-damper on one side of the main damper plate,
wherein the pre-damper comprises:
a housing having an axially oriented flange defining a plurality of hooked, resiliently deformable tongues which together define a first shoulder carried by the housing, the housing further defining a second shoulder carried thereby, the damper further comprising means mounting the housing with the said first shoulder being closer to the main damper plate than is the second shoulder, and the main damper plate having a plurality of apertures;
coupling means comprising a plurality of coupling fingers carried by the housing, with each said coupling finger engaging in a complementary said aperture of the main damper plate, whereby to couple the housing to the main damper plate for rotation with the latter;
a secondary damper plate within the housing and surrounding the hub;
means coupling the secondary damper plate to the hub for rotation with the latter;
two secondary guide rings;
means mounting the said secondary guide rings in the housing for rotation with the housing but for axial movement with respect to the housing, with one said guide ring being arranged on a respective side of the main damper plate, and with the said first and second shoulders retaining the secondary guide rings between them;
and second circumferentially acting resilient means, of lesser stiffness than the said first circumferentially acting resilient means, coupling the secondary guide rings to the said secondary damper plate,
wherein each said hooked tongue is radially inward of a corresponding said coupling finger, for penetration into the said complementary aperture of the main damper plate associated with the same coupling finger.

2. A damper according to claim 1, wherein each said aperture in the main damper plate has a circumferential shape complementary to that of the associated coupling finger, with the associated said aperture being of greater radial depth than the latter.

3. A damper according to claim 2, wherein the housing further defines at its outer periphery a plurality of radial projections, with each said radial projection defining a said coupling finger and a said hooked tongue associated therewith.

4. A damper according to claim 3, wherein each said projection of the housing defines a radial engagement surface extending radially outwardly of the associated coupling fingers for engagement on the main damper plate.

5. A damper according to claim 4, wherein each said projection of the housing is formed with at least one stiffening rib.

6. A damper according to claim 5, wherein each said projection of the housing has two stiffening ribs arranged on either side of the coupling finger and hooked tongue defined by that projection.

7. A damper according to claim 6, wherein each said stiffening rib joins the associated said radial engagement surface to the said axial flange of the housing.

8. A damper according to claim 1, wherein the housing is of plastics material and defines a transverse wall having mould stripping passages defining grooves and hooks of the said hooked tongues.

9. A damper according to claim 1, wherein the said axial flange of the housing defines a plurality of axial grooves, one of the secondary guide rings being closer than the other to the main damper plate, with each secondary guide ring defining tenons cooperating with the said axial grooves in the axial flange, and with each resiliently deformable hooked tongue cooperating with a respective one of the said tenons of the guide ring which is the closer to the main damper plate.

* * * * *